United States Patent Office 3,278,376
Patented Oct. 11, 1966

3,278,376
METHOD FOR PROTECTING SEED AGAINST FUNGI WITH N,N'-BIS(DIMETHYLAMINO) THIURAM DISULPHIDE
Henry Morris Fox, Bracknell, England, assignor to Imperial Chemical Industries Limited, London, England, a corporation of Great Britain
No Drawing. Filed Jan. 30, 1963, Ser. No. 255,101
Claims priority, application Great Britain, Feb. 5, 1962, 4,286/62
6 Claims. (Cl. 167—38)

This invention relates to fungicidal seed dressings and particularly to the use of N,N'-bis(dimethylamino) thiuram disulphide as a fungicidal seed dressing.

The invention consists in one aspect in the treatment of seed for sowing with N,N'-bis(dimethylamino) thiuram disulphide, that is, the compound of the formula:

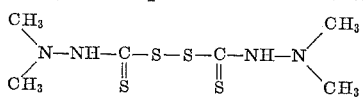

This compound, which we have found to be very effective against seed-borne cereal diseases of the Tilletia, Ustilago and Helminthosporium species has been referred to in a paper by K. L. Klopping and G. J. M. Van der Kerk in Recueil des Travaux Chimiques des Pays-Bas, Vol. 70, 1951, but it was reported there to have relatively low fungicidal activity. For example, the table on page 921 of that paper gives results obtained using four different species of fungi against which the compound was compared with tetra-methylthiuram disulphide (known also by the common name "thiram"), and it was found to be markedly inferior to the latter compound. The results given for the two compounds in the table relate to minimum concentration of each compound causing complete inhibition of growth in roll-culture tests and are as follows:

| Compound | Minimum concentration causing complete inhibition of growth—Parts per million (mg. per liter) | | | |
|---|---|---|---|---|
| | Botrytis cinerea | Penicillium italicum | Aspergillus niger | Rhizoctonia nigricans |
| (CH3)2N—C—S—S—C—N(CH3)2 (with =S, =S) | 0.2 | 0.2 | 10 | 2 |
| (CH3)2N-NH-C-S-S-C-NH-N(CH3)2 (with =S, =S) | 0.2 | 10 | 100 | 500 |

It will be seen that against only one of the species of fungi were comparable results obtained with the two compounds: against the other three species N,N'-bis(dimethylamino) thiuram disulphide was shown to be from 10 to 250 times less active than thiram.

It is therefore now most surprising to find that N,N'-bis(dimethylamino) thiuram disulphide is so very effective as a seed fungicide, being far more effective than thiram—an effect which could not have been predicted.

The thiuram disulphide of this invention can be applied to the seed, according to conventional techniques for instance, in the form of a powder dressing in which the thiuram disulphide is in admixture with a suitable powder diluent, or as a liquid composition in which the thiuram disulphide is in solution or suspension in a suitably non-phytotoxic liquid. The invention thus also consists in fungicidal compositions containing as active ingredient N,N'-bis(dimethylamino) thiuram disulphide together with a suitable seed dressing diluent. The proportion of active ingredient, especially where the composition is a powder having a powder diluent, can conveniently be from 10 to 75 (especially from 25 to 50) percent by weight of the composition. The precise concentration of active ingredient chosen for the composition depends to a large extent upon the rate at which the composition is to be used for treating the seed. Using the conventional rate of 2 ounces of dressing per bushel of seed it has been found that good results are obtained using a composition containing 50% by weight of active ingredient.

Although the invention is not to be construed as limited by any particular theory it is thought that N,N'-bis(dimethylamino) thiuram disulphide functions as a seed fungicide, at least in part, by breakdown to the corresponding dithiocarbamate and isothiocyanate:

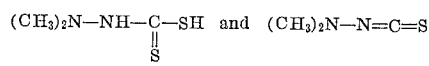

the corresponding thiuram monosulphide

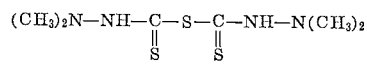

being a possible intermediate.

The invention is illustrated by the following examples.

Example 1

This example describes the preparation of N,N'-bis(dimethylamino) thiuram disulphide.

N,N-dimethyl hydrazine (15.4 ml.—0.2 M) and carbon disulphide (12 ml.—0.2 M) were stirred into 50 ml. of water in a flask cooled in an ice bath. The contents of the flask were then heated to 40° C., and there was then run in a solution of sodium hydroxide (8 g.—0.2 M) in water (40 ml.). The mixture in the flask was then stirred for 2½ hours while being maintained at 40° C., then cooled to a temperature of between 0 and −5° C. and at that temperature there was added to the flask a solution of ammonium persulphate (57 g.—0.25 M) in water (200 ml.), the persulphate being added slowly in the form of drops, over a period of 2½ hours during which contents of the flask were stirred continuously; the temperature of the contents of the flask was maintained meanwhile between 0 and −5° C. At the end of the 2½ hour period, iced water (100 ml.) was added to the flask and the stirring was continued for a further half hour.

The solid which had formed in the flask was then removed by filtration, slurried in a mortar with 500 ml. of water, the slurry was filtered and the recovered solid dried in a vacuum desiccator over phosphorus pentoxide. The dried product was then re-slurried with carbon disulphide, the slurry filtered and the recovered solid was dried as before in a vacuum desiccator over phosphorus pentoxide. The final product thus obtained had a melting point of 124° C. and its analysis showed that it was N,N'-bis(dimethylamino) thiuram disulphide.

Example 2

This example describes the use of the product obtained from Example 1 as the active ingredient of a fungicidal seed dressing composition. In the following description the parts referred to are parts by weight unless otherwise stated.

50 parts of the product of Example 1 were mixed in a mortar with two parts of mineral oil and the resulting product was mixed in a mortar with 48 parts of talc. The seed dressing composition thus obtained was then used to dress oat and wheat seed infected with the appropriate test organisms and the dressed seed was subsequently used in trials to assess the value of the composition against oat leaf stripe, oat smut and wheat bunt. The rate of application of the composition to the seed in each case was 2 ounces per bushel of seed, which for oat seed corresponds to the rate of 0.3% by weight of the seed and for wheat seed 0.2% by weight of the seed. The results obtained in the trials are set out below in Tables 1, 2 and 3.

Table 1 relates to glasshouse tests on the control of oat leaf stripe (*Helminthosporium avenae*), and Tables 2 and 3 relate to field trials on the control of oat smut (*Ustilago* spp.) and wheat bunt (*Tilletia caries*) respectively. It will be seen that in all three trials the composition containing the product of Example 1 was compared with a standard seed dressing composition containing a PMA/EMC mixture. This PMA/EMC mixture used in the comparative tests was in the form of a powder composition containing about 1.44% PMA (phenyl mercuri acetate), 0.67% EMC (ethyl mercuri chloride) and 4% mineral oil, the balance being talc and the two mercurial ingredients representing a mercury content (calculated as metallic mercury) of about 1%.

It will be seen that the composition tested gave very good protection against all three of the seed-borne diseases in respect of which the trials were carried out.

TABLE 1.—CONTROL OF OAT LEAF STRIPE (*HELMINTHOSPORIUM AVENAE*)

| Active Ingredient | Load on seed (p.p.m.) | Incidence of Leaf Stripe (Percent) | |
|---|---|---|---|
| | | Observed (De-Transformed) | Transformed |
| Control, untreated | | 31.6 | 34.2 |
| Product of Example 1 | 1,500 | 1.9 | 7.9 |
| PMA/EMC mixture | [1] 30 | 0.2 | 2.3 |

[1] Hg.

The figures given under the heading "transformed" relate to the results obtained on subjecting the original observed figures to statistical analysis from which the significant difference at a probability of 0.05 was calculated as being 5.9. Thus, it will be seen that there is no significant difference between the results obtained for the two active ingredients tested—that is, the product of Example 1 is fully comparable with the highly-effective PMA/EMC composition.

TABLE 2.—CONTROL OF OAT SMUT (*USTILAGO* SPP.)

| Active Ingredient | Load on seed (p.p.m.) | Incidence of Oat Smut (Percent) | | |
|---|---|---|---|---|
| | | Trial A | Trial B | Mean |
| Control, untreated | | 34.2 | 5.3 | 19.8 |
| Product of Example 1 | 1,500 | 2.0 | 0 | 1.0 |
| PMA/EMC mixture | [1] 30 | 4.4 | 0 | 2.2 |
| Thiram | 1,500 | 28.1 | 0.3 | 14.2 |

[1] Hg.

TABLE 3.—CONTROL OF WHEAT BUNT (*TILLETIA CARIES*)

| Active Ingredient | Load on seed (p.p.m.) | Incidence of Wheat Bunt (Percent) | | |
|---|---|---|---|---|
| | | Trial C | Trial D | Mean |
| Control, untreated | | 51.0 | 56.9 | 54.0 |
| Product of Example 1 | 1,000 | 0.1 | 0.4 | 0.25 |
| PMA/EMC mixture | [1] 20 | 0 | 0.4 | 0.2 |
| Thiram | 1,000 | 5.3 | 1.5 | 3.4 |

[1] Hg.

The results given in Tables 2 and 3 above show that N,N'-bis(dimethylamino) thiuram disulphide is highly effective in controlling oat smut and wheat bunt in these field trials and was equally as effective as the PMA/EMC composition. Further tests have shown the compound to have good fungicidal activity against *Septoria nodorum*, *Fusarium nivale* and *F. colmorum*. Moreover, N,N'-bis(dimethylamino)thiuram disulphide is far less poisonous than PMA/EMC mixtures—a fact which constitutes a major commercial advantage now that the widespread use of toxic chemicals in agriculture is coming under increasing scrutiny. For instance, the mammalian toxicity of N,N'-bis(dimethylamino) thiuram disulphide as measured as $LD_{50}$ of rats by intraperitoneal injection is 400–800 mg./kg. compared with values of less than 10 mg. mercury/kg. for each of PMA and EMC.

It will also be seen from Tables 2 and 3, that N,N'-bis(dimethylamino) thiuram disulphide was much superior to an equal amount of thiram. This is in marked contrast to the results given in the paper by Klopping and Van der Kerk referred to above, in which the compound was shown to be much inferior to thiram in in vitro tests.

What I claim is:

1. The method which comprises treating seed for sowing with a fungicidally effective amount of N,N'-bis(dimethylamino) thiuram disulphide.

2. The method which comprises treating seed for sowing with a fungicidally effective amount of a seed dressing composition comprising as active ingredient N,N'-bis(dimethylamino) thiuram disulphide, a minor proportion of a dispersing agent and a seed dressing diluent for the said active ingredient, said active ingredient being present in an amount of from 10 to 75% by weight of the composition.

3. The method which comprises treating cereal seed prior to sowing with a fungicidally effective amount of a seed dressing containing as active ingredient N,N'-bis (dimethylamino) thiuram disulphide, at the rate of about 2 ounces of active ingredient for each bushel of seed.

4. The method of controlling Tilletia species in wheat which comprises treating the seed from which the wheat is to be grown with a fungically effective amount of N,N'-bis(dimethylamino) thiuram disulphide.

5. The method of controlling Helminthosporium species in oat which comprises treating the seed from which the oat is to be grown with a fungicidally effective amount of N,N'-bis(dimethylamino) thiuram disulphide.

6. The method of controlling Ustilago species in oat which comprises treating the seed from which the oat is to be grown with a fungicidally effective amount of N,N'-bis(dimethylamino) thiuram disulphide.

References Cited by the Examiner

Recueil des Travaux Chimiques des Pays-Bas, vol. 70, 1951, pages 917–939 (pages 920–924 relied on).

JULIAN S. LEVITT, *Primary Examiner.*

G. A. MENTIS, *Assistant Examiner.*